United States Patent [19]
Haji et al.

[11] Patent Number: 5,671,324
[45] Date of Patent: Sep. 23, 1997

[54] LIGHT BEAM HEATING APPARATUS WITH OPTICAL ENERGY CORRECTION COMPENSATING FOR LAMP ELECTRODE WEAR AND AGING

[75] Inventors: Nobuyuki Haji, Osaka; Moriaki Kawasaki, Habikino; Tamotsu Ikeda, Toyonaka; Masayoshi Ueda, Ashiya, all of Japan

[73] Assignee: Matsushita Electric Industrial Co., Ltd., Osaka-fu, Japan

[21] Appl. No.: 550,112

[22] Filed: Oct. 30, 1995

[30] Foreign Application Priority Data

Oct. 31, 1994 [JP] Japan .................................. 6-266953
Nov. 15, 1994 [JP] Japan .................................. 6-280579

[51] Int. Cl.⁶ .................................................. F21V 7/00
[52] U.S. Cl. ........................ 392/419; 392/407; 219/85.12
[58] Field of Search ............................ 392/419–421, 392/407; 315/155, 158, 150, 149; 219/85.12, 85.13; 250/208.2, 208.4, 208.5, 208.6, 492.1, 504 R

[56] References Cited

U.S. PATENT DOCUMENTS

| | | | |
|---|---|---|---|
| 3,670,202 | 6/1972 | Paine et al. | 315/158 |
| 3,805,065 | 4/1974 | Williams | 315/158 |
| 3,996,494 | 12/1976 | Suga | 315/158 |
| 4,190,795 | 2/1980 | Schultheis | 315/158 |
| 4,381,564 | 4/1983 | Suga | 315/158 |
| 4,982,139 | 1/1991 | Amir et al. | 315/158 |
| 5,042,948 | 8/1991 | Fletcher | 315/158 |
| 5,335,309 | 8/1994 | Fujii et al. | |

FOREIGN PATENT DOCUMENTS

| | | | |
|---|---|---|---|
| 380877 | 8/1990 | European Pat. Off. | |
| 58-27466 | 2/1983 | Japan | |
| 61-169856 | 7/1986 | Japan | |
| 1-220396 | 9/1989 | Japan | 315/149 |
| 2-15597 | 1/1990 | Japan | 315/149 |
| 2-100290 | 4/1990 | Japan | 315/149 |
| 3-253884 | 11/1991 | Japan | |
| 4-19544 | 1/1992 | Japan | |
| 6-119980 | 4/1994 | Japan | 315/158 |

OTHER PUBLICATIONS

Schoonover et al, "Lamp Intensity Control", IBM Tech. Disclosure, vol. 8, Noi. 8, Jan. 1966.

*Primary Examiner*—Tu B. Hoang
*Attorney, Agent, or Firm*—Wenderoth, Lind & Ponack

[57] ABSTRACT

A photosensor arranged at the center of a light-receiving end of an optical fiber bundle detects an optical intensity which is converted by a photoelectric converter to an electric signal. Then, the optical energy provided at the optical fiber bundle is calculated based on the signal. On the other hand, a correction coefficient is calculated from optical intensity signals when the lamp is new and when the element in the lamp wears, and the setting value of the output optical intensity of the optical fiber bundle is corrected. Then, the current supplied to the lamp by a power supply is controlled according to a difference between the setting value and the measured optical energy. Thus, the optical energy to be received through the optical fiber bundle is controlled stably irrespective of the change of optical intensity distribution due to wear of the electrode of the lamp. Similarly, the correction coefficient is calculated from optical intensities measured with photodetectors arranged at and off the center of a light-receiving end of an optical fiber bundle.

12 Claims, 4 Drawing Sheets

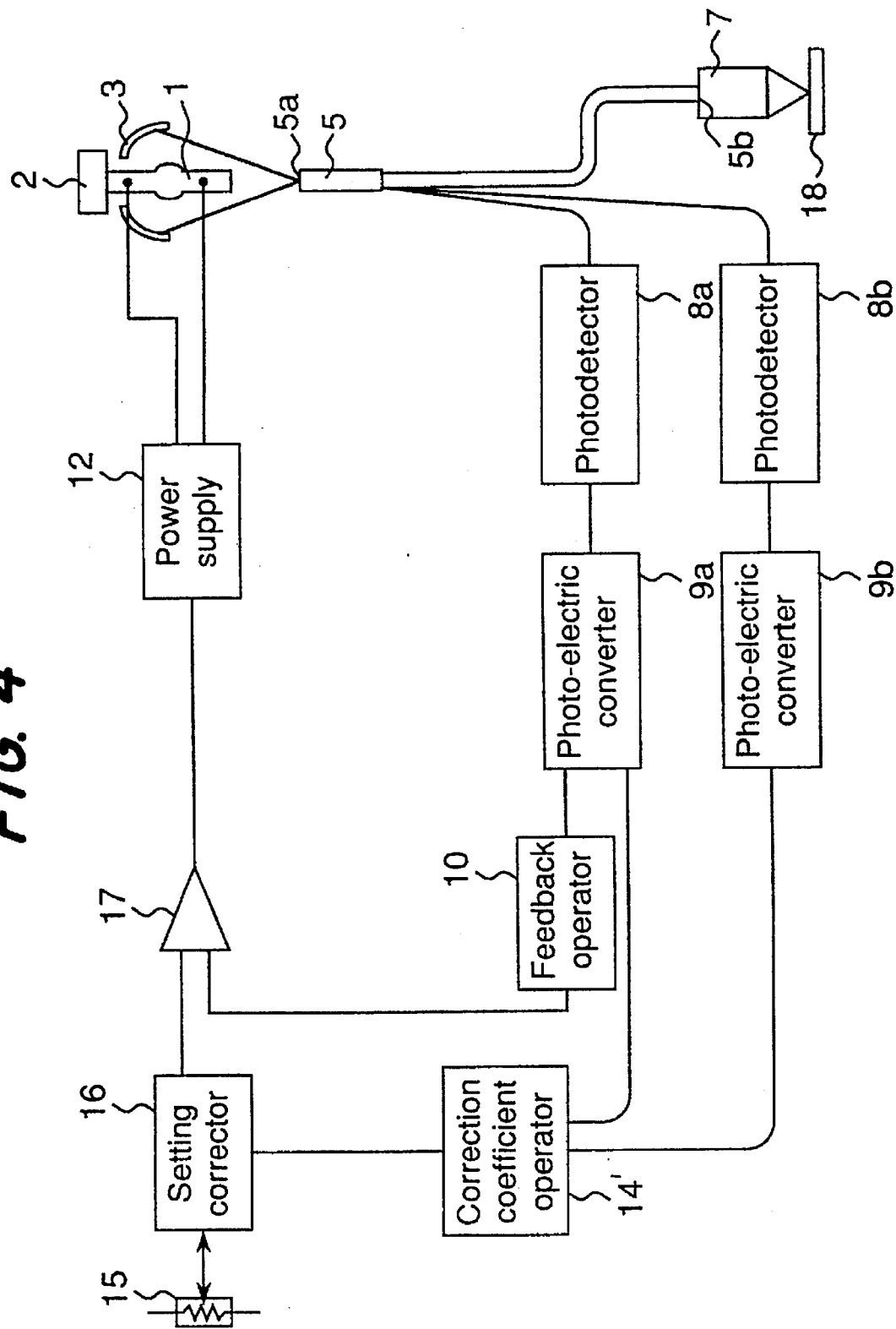

LIGHT BEAM HEATING APPARATUS WITH OPTICAL ENERGY CORRECTION COMPENSATING FOR LAMP ELECTRODE WEAR AND AGING

BACKGROUND OF THE INVENTION

1. Field of the Invention

The present invention relates to a light beam heating apparatus which can heat a material locally by using a light beam condensed from a light emitted by a lamp.

2. Description of the Prior Art

A light beam heating apparatus as a non-contact local heating apparatus is used for soldering of electronics parts, heating and fusing a resin material, removing coating of a polyurethane line and the like. U.S. Pat. No. 5,335,309 of Fujii et al. describes such a light beam heating apparatus. The apparatus can heat a material under interest locally by condensing a light from a light emitting lamp to be incident at an end of an optical fiber bundle and by condensing the light coming from the other end of the optical fiber bundle while putting the material at a focal position of the light beam. Such an apparatus is used for soldering of electronics parts, heating and fusing a resin material and the like.

When the light beam heating apparatus is operated, the optical energy at the incoming end of the optical fiber bundle is controlled to become constant by using a photodetector arranged near the incoming end of the optical fiber bundle. The total optical energy is calculated from the output signal of the photodetector. The output power of the lamp is set by an output setter. Then, a difference of the output power setting with the detected output is fed back to the output setter to control the current supplied to the lamp. Thus, the optical energy of an energy irradiating a material to be heated is controlled to become constant.

However, the optical power of the light beam is controlled by assuming that the optical intensity distribution is constant, or a change of the distribution due to a change of shape at a top of the electrode in the lamp (see U.S. Pat. No. 5,335,309). However, this assumption does not necessarily hold, and this is explained with reference to FIG. 1. The lamp is surrounded by an elliptic mirror, and the mirror is generally designed by assuming that a very small arc light source formed near a cathode point of the lamp is a point light source. When the lamp is new, the arc light source can be approximated as a point light source, and the light condensed around a light-receiving end of the optical fiber bundle has a distribution approximated as a Gaussian intensity distribution, as represented as "A" in FIG. 1. However, the electrode wears as it is used, and the shape at the top of the electrode become flat. Then, the size of the arc light source near the cathode point becomes thick and the light condensed around the light-receiving end of the optical fiber bundle has a more flat distribution, as represented as "B" in FIG. 1. When the photodetector is set at the center of the light-receiving end, it detects the optical intensity at the center of the optical intensity distribution. Then, even if the intensity distribution becomes flat like the distribution "B", the photodetector detects the same intensity. Therefore, the optical intensity distribution is lifted up entirely as shown as "C" in FIG. 1. The optical fiber bundle is constructed as a bundle, and has an effective diameter "D" shown in FIG. 1. Then, a large error arises with reference to the total amount of optical energy of the distribution "A". Then, the optical intensity coming out from another end of the optical fiber bundle increases. Therefore, even if the output setter is set at a constant value, heating conditions for a material to be heated change, and stable heating cannot be performed if the intensity is not measured with a power meter or the like.

SUMMARY OF THE INVENTION

An object of the present invention is to provide a light beam heating apparatus which can keep heating conditions even if optical intensity distribution of the lamp changes due to wear of the electrode of the lamp.

In a light beam heating apparatus of the invention, a light source including a lamp emits a light, and an optical propagation means condenses the light and generates a light beam irradiating a work. An output power setter sets an output optical energy value, while an estimation means estimates an optical energy of the light beam generated by the optical propagation means. In an example, the estimation means estimates the optical energy according to a change in optical intensity of the light condensed by the light propagation means by using optical intensity data measured at different times. In another example, the estimation means estimates the optical energy according to two or more optical intensities measured at different positions in the light condensed by the light propagation means. A corrector corrects the output optical energy level set by the output power setter according to the optical energy estimated by the estimation means. Then, a power supply which supplies a current to the lamp according to the output optical energy level corrected by the corrector.

An advantage of the present invention is that heating with a light beam can be performed in a reproducible way, irrespective of wear of the lamp in the light source.

BRIEF DESCRIPTION OF THE DRAWING

These and other objects and features of the present invention will become clear from the following description taken in conjunction with the preferred embodiments thereof with reference to the accompanying drawings, and in which:

FIG. 4 is a diagram of a light beam heating apparatus of a second embodiment of the invention; and FIG. 5 is an enlarged perspective view of the light-receiving end 5a.

DETAILED DESCRIPTION OF THE PREFERRED EMBODIMENTS

Figure 2:
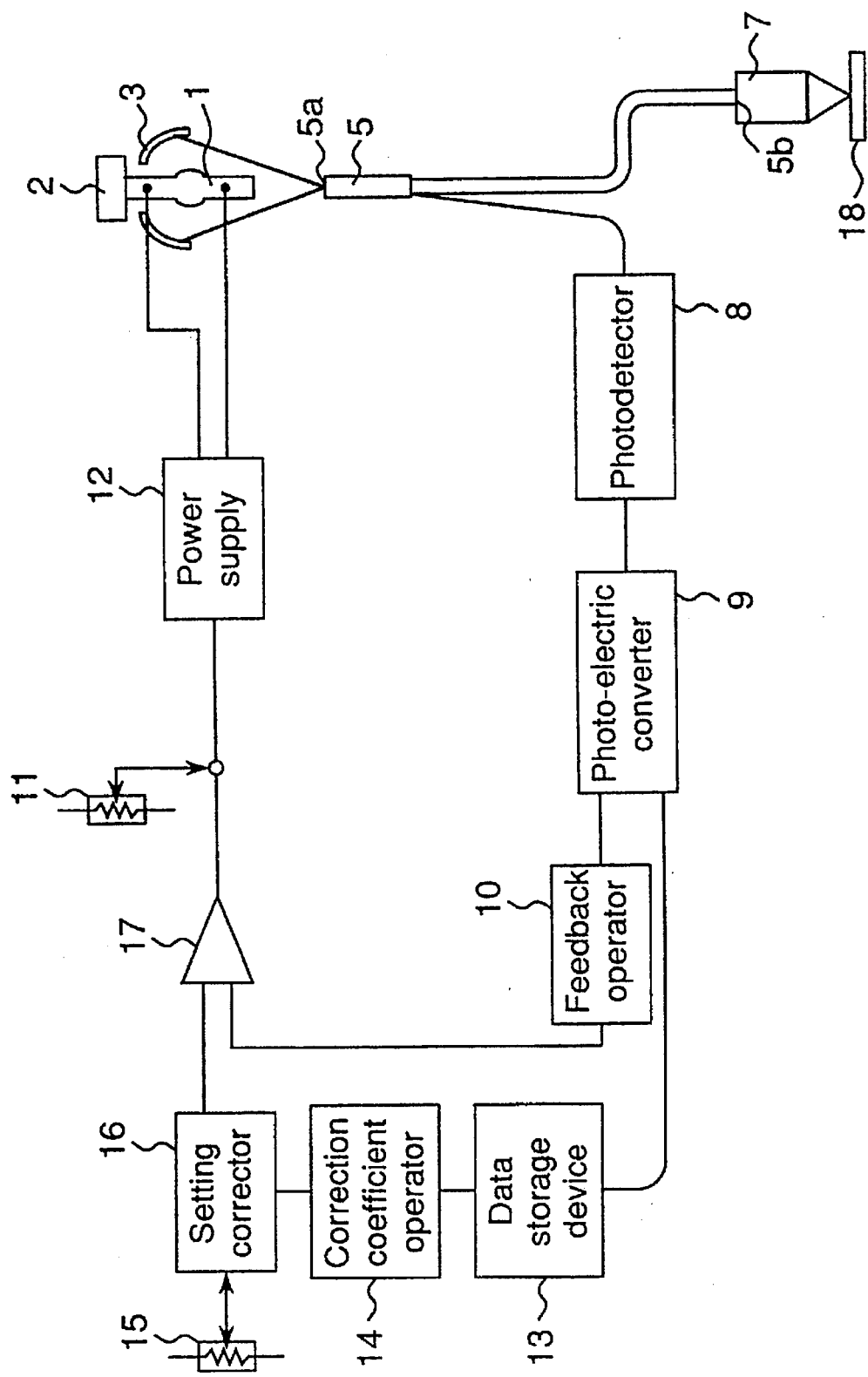
FIG. 2 is a diagram of a light beam heating apparatus of a first embodiment of the invention.

Referring now to the drawings, wherein like reference characters designate like or corresponding parts throughout the several views, FIG. 2 shows a light beam heating apparatus according to a first embodiment of the invention. A lamp 1 such as a Xenon lamp is mounted at a base 2 enclosed with an elliptic mirror 3 having a first focal point and a second focal point. A light emitting point of the lamp 1 is located at the first focal point. An optical fiber bundle 5 comprises a bundle of hundreds of optical fiber elements. A light-receiving end 5a of the optical fiber bundle is fixed with a tool (not shown) at the second focal point. A lens unit 7 comprises a lens system for condensing a light going out from another end 5b of the optical fiber bundle 5, and the light focuses on a work 18 to be heated. A photosensor 8 comprises an optical fiber element included in the optical fiber bundle 5, and a light-receiving end thereof is located at the central axis of the optical fiber bundle 5 at the light-receiving end 5a.

A photoelectric converter 9 converts an output of the photodetector 8 to an electric signal. A feedback operator 10 calculates a total optical energy entering into the light-receiving end of the optical fiber bundle 5. A command circuit 11 sets a current level and sends a command through a switch to supply a constant current to the lamp 1. A power supply 12 supplies a current in correspondence to the command and the current level received from the command circuit 11. A data storage device 13 comprises two registers for storing output values of the photoelectric converter 9, that is, the output values when the lamp 1 is new and when the element of the lamp wears, as will be explained later. A correction coefficient operator 14 calculates a correction coefficient based on the two values stored in the data storage device 13. An output setter 15 sets an output intensity from the optical fiber bundle 5. A setting corrector 16 corrects the output intensity to be set by the output setter 15 according to the output value from the correction coefficient operator 14. An error amplifier 17 amplifies an error of the output value of the feedback amplifier 10 relative to the output value of the setting corrector 16 and sends a current value through the switch to the power supply 12.

Next, the operation of the light beam heating apparatus is explained. First, the lamp 1 is turned on by the power supply 12 with a constant lamp current and starts to emit a light. Because the radiating point of the lamp 1 is located at a first focal point of the elliptic mirror 3, the generated light is condensed at a second focal point or at the light receiving end 5a of the optical fiber bundle 5. The condensed light is detected by the photodetector 8 located at the light receiving end 5a, and the output light of the photodetector 8 is converted by the photoelectric converter 9 to an electric signal.

The feedback operator 10 receives the electric signal and calculates the total optical energy P(r) to propagate through the optical fiber bundle 5, by assuming that the optical intensity distribution of the light condensed at the light receiving end 5a is a Gaussian distribution.

$$P(r)=a \cdot I(0), \quad (1)$$

where "a" denotes a constant and I(0) denotes the output value of the photoelectric converter. On the other hand, the data storage device 10 has stored the output value $P_0$ of the photoelectric converter 9 when the lamp 1 is new and another value $P_n$ when the electrode of the lamp 1 wears. The value $P_0$ is kept until the lamp 1 is exchanged, while the other $P_n$ is updated when the lamp is lighted next time as the output value P(r) measured this time.

The correction coefficient operator 14 calculates a correction coefficient $K_f$ according to the two output data $P_0$ and $P_n$ by the following Eq. (2):

$$K_f=1+\gamma\{(P_0-P_n)/P_0\} \quad (2)$$

where γ denotes a constant determined experimentally beforehand according to the degree of the change in optical intensity distribution depending on the kind and the shape of the electrode of the lamp 1.

The setting corrector 16 receives the correction coefficient $K_f$ and divides the setting value of the output setter 15 by the correction coefficient $K_f$. The error amplifier 17 amplifies an error of the output of the feedback operator 10 relative to the setting corrector 16, and the power supply 12 changes the output current for the lamp 1 according to the error received from the error amplifier 17 in order to keep the total optical energy constant at the light-receiving end 5a. The optical energy condensed at the light-receiving end 5a is emitted from the other end 5b of the optical fiber bundle 5, and condensed by the lens unit to irradiate the work. Because the total optical energy at the light-receiving end 5a is kept constant, the energy irradiating the work also becomes constant.

Figure 3:
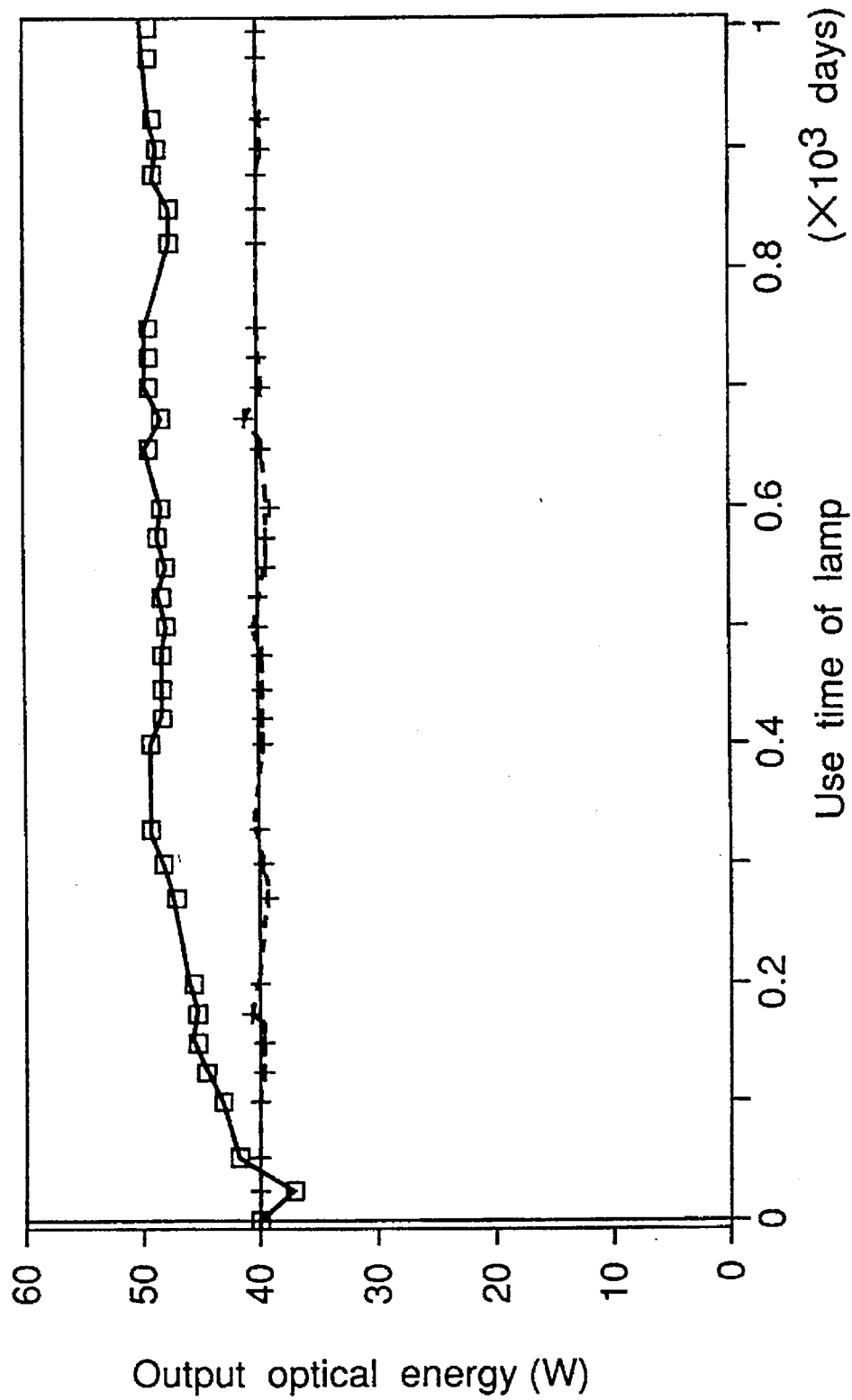
FIG. 3 is a graph of the output energy plotted against use time of the lamp.

FIG. 3 shows a graph of the output energy plotted against use time of the lamp 1 for the apparatus of the first embodiment of the invention (+) and for a prior art apparatus (open square). The setting value at the output setter 15 is 40 W. The total optical energy supplied by the prior art apparatus drifts about 25% relative to the setting value, especially from the start to about 300 hours of use time. On the contrary, the counterpart of the embodiment is almost constant.

Figure 5:
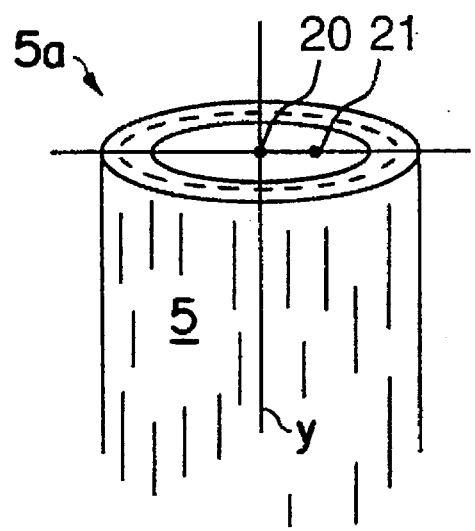
Figure 1:
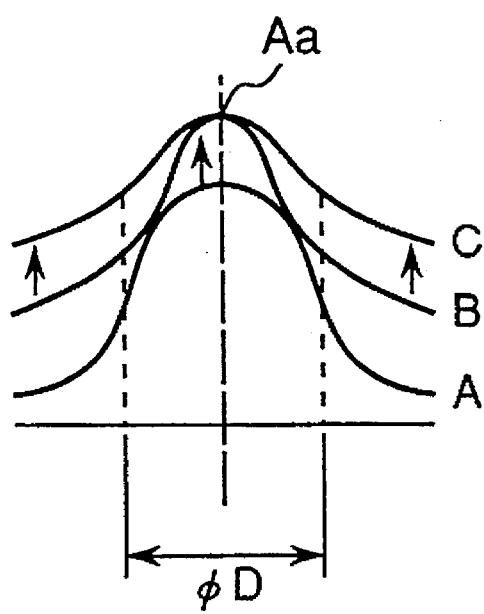
FIG. 1 is a graph of optical intensity distribution.

FIG. 4 shows a light beam heating apparatus according to a second embodiment of the invention. A lamp 1 such as a Xenon lamp is mounted at a base 2 enclosed with an elliptic mirror 3 having a first focal point and a second focal point. A light emitting point of the lamp 1 is located at the first focal point. An optical fiber bundle B comprises a bundle of hundreds of optical fiber elements. A light-receiving end 5a of the optical fiber bundle is fixed with a tool (not shown) at the second focal point. A lens unit 7 comprises a lens system for condensing a light going out from another end 5b of the optical fiber bundle 5. Referring to FIG. 5, a photosensor 8a comprises an optical fiber element 20 included in the optical fiber bundle B, and a light-receiving end thereof is located at the central axis Y of the optical fiber bundle 5 at the light-receiving end 5a, while another photosensor 8b comprises another optical fiber element 21 included in the optical fiber bundle B, with its light-receiving end located off the central axis Y of the optical fiber bundle 5 at the light-receiving end.

First and second photoelectric converters 9a and 9b convert outputs of the first and second photodetectors 8 to electric signals. A feedback operator 10 calculates a total optical energy entering into the center of the light-receiving end of the optical fiber bundle 5 according the output of the first photoelectric converter 9a. A command circuit 11 sets a current level and sends a command to supply a constant current to the lamp 1. A power supply 12 supplies a current in correspondence to the command and the current level received from the command circuit 11. A correction coefficient operator 14' calculates a correction coefficient based on the two output values of the first and second photoelectric converters 9a and 9b, that is, the output values at and off the center of the optical fiber bundle 5. An output setter 15 sets an output intensity from the optical fiber bundle 5. A setting corrector 16 corrects the output intensity to be set by the output setter 15 according to the output value from the correction coefficient operator 14'. An error amplifier 17 amplifies an error of the output value of the feedback amplifier 10 relative to the output value of the setting corrector 16 to set a current value for the power supply 12.

Next, the operation of the light beam heating apparatus is explained. First, the lamp 1 is turned on by the power supply 12 with a constant lamp current and starts to emit a light. Because the radiating point of the lamp 1 is located at a first focal point of the elliptic mirror 3, the generated light is condensed at a second focal point or at the light receiving end 5a of the optical fiber bundle 5, and the light focuses on a work 18 to be heated. The condensed light is detected by the first photodetector 8a located at the light receiving end 5a. The output light of the first photodetector 8a is converted by the first photoelectric converter 9a to an electric signal. The feedback operator 10 receives the electric signal and calculates the total optical energy to propagate through the optical fiber bundle 5, by assuming that the optical intensity distribution of the light condensed at the light receiving end 5a is a Gaussian distribution. On the other hand, the correction coefficient operator 14' calculates a correction coefficient $K_f'$ according to the output data of the first and second photoelectric converters 9a and 9b. A correction coefficient $K_f'$ is calculated by the following Eq. (3):

$$K_f'=1+\gamma\{(P_1-P_2)/P_0\} \quad (3)$$

where $P_1$ denotes an output data of the first photoelectric converter 9a, $P_2$ denotes an output data of the second photoelectric converter 9b and $\gamma$ denotes a constant determined experimentally beforehand according to the degree of the change in optical intensity distribution depending on the kind and the shape of the electrode.

The correction coefficient $K_f'$ is sent to the setting corrector 16, and the setting corrector 16 divides the setting value of the output setter 15 by the correction coefficient $K_f'$. The error amplifier 17 amplifies an error of the output of the feedback operator 10 relative to the setting corrector 16, and the power supply 12 changes the output current for the lamp 1 according to the error received from the error amplifier 17 in order to keep the total optical energy constant at the light-receiving end 5a. The optical energy condensed at the light-receiving end 5a is emitted from the other end 5b of the optical fiber bundle 5, and condensed by the lens unit to irradiate the work 18. Because the total optical energy at the light-receiving end 5a is kept constant, the energy irradiating the work 18 also becomes constant.

In the second embodiment, two photodetectors 8a and 8b are provided at the optical fiber bundle 5. However, more than two photodetectors may be arranged at the optical fiber bundle 5, and the correction coefficient may be determined according to the optical intensity distribution detected by the photodetectors.

In the above-mentioned first and second embodiments, the setting value of the output setter 15 is corrected according to the correction coefficient $K_f$, $K_f'$. However, the output of the feedback operator 10 may be corrected instead of the output setter 15.

As explained above, the total energy of the light beam irradiating a work can be kept constant, irrespective of the change in optical intensity distribution due to wear of the electrode of the lamp. Therefore, the heating process with the light beam can be reproducible.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A light beam heating apparatus comprising:

a light source including a lamp;

an optical propagation means for condensing a light emitted by said light source and for generating a light beam for irradiating a work;

an output power setter for setting an output optical energy value;

an estimation means for estimating an optical energy of the light beam generated by said optical propagation means according to a predetermined assumed change in spacial optical intensity distribution across a cross section of the light to be condensed by said optical propagation means;

a corrector for correcting the output optical energy level set by said output power setter according to the optical energy estimated by said estimation means; and a power supply which supplies a current to the lamp according to the output optical energy level corrected by said corrector.

2. The apparatus according to claim 1, wherein said light propagating means comprises an optical fiber bundle which propagates a light received from the lamp in said light source.

3. A light beam heating apparatus comprising:

a light source including a lamp;

an optical propagation means for condensing a light emitted by said light source and for generating a light beam for irradiating a work;

a photodetector which detects an optical intensity at only a portion of a cross-section of the light to be condensed by said light propagation means;

a power supply which supplies current to the lamp;

a storage device for storing two output values of said photodetector, a first output value of the two output values being stored when the lamp of said light source is energized at a first time, a second output value of the two output values being stored at a later second time after the first output value is stored; and an output power energy setter for setting an output energy supplied by said light propagation means; and a corrector for correcting the optical energy set by said optical energy setter based on the two output values of said photodetector stored in said storage device.

4. The apparatus according to claim 3, wherein said corrector comprises:

a feedback operator for calculating a total optical energy condensed by said light propagation means according to the optical intensity detected by said photodetector;

an operator for calculating a correction coefficient based on the two output values of said photodetector stored in said storage device;

an optical energy corrector for correcting the optical energy set by said optical energy setter according to the correction coefficient calculated by said operator; and an error amplifier for operating a difference between the total optical energy calculated by said feedback operator and the optical energy corrected by said corrector and for setting the current supplied by said power supply.

5. The apparatus according to claim 4, wherein said operator calculates the correction coefficient $K_f$ according to a following formula:

$$K_f=1+\gamma\{(P_0-P_n)/P_0\},$$

where $\gamma$ denotes a constant determined beforehand, $P_0$ denotes the first output value stored in said storage device when the lamp of said light source is energized for a first time, and $P_n$ denotes the second output value stored in said storage device.

6. The apparatus according to claim 3, wherein said data storage device stores the first output value when the lamp of said light source is new and the second output value corresponding to the most recent energization of the lamp.

7. The apparatus according to claim 5, wherein said data storage device stored the first output value $P_0$ when the lamp of said light source is energized for a first time and the second output value $P_n$ corresponding to the most recent energization of the lamp.

8. The apparatus according to claim 3, further comprising a current setter for setting the current supplied by said power supply when said apparatus is turned on.

9. The apparatus according to claim 3, wherein the lamp in said light source is a Xenon lamp.

10. The apparatus according to claim 3, wherein said light propagating means comprises an optical fiber bundle.

11. The apparatus according to claim 3, wherein said photodetector detects an optical intensity at a central position in the light to be condensed by said light propagation means.

12. The apparatus according to claim 10, wherein said optical fiber bundle comprises a bundle of a plurality of optical fiber elements and said photodetector comprises an optical fiber element arranged at a center of the optical fiber elements of said optical fiber bundle.

* * * * *